United States Patent [19]
Lott

[11] Patent Number: 5,118,139
[45] Date of Patent: Jun. 2, 1992

[54] LEAK REPAIR CLAMP

[75] Inventor: Charles L. Lott, Alvin, Tex.

[73] Assignee: Team, Inc., Alvin, Tex.

[21] Appl. No.: 373,629

[22] Filed: Jun. 28, 1989

Related U.S. Application Data

[63] Continuation of Ser. No. 105,819, Oct. 8, 1987, abandoned.

[51] Int. Cl.[5] ............................................. F16L 17/00
[52] U.S. Cl. ...................................... 285/15; 285/176;
285/292; 285/373; 285/364; 285/419; 285/90;
285/411; 138/99
[58] Field of Search ...................... 285/15, 16, 17, 292,
285/372, 373, 418, 419, 177, 176, 364, 363, 365,
405, 406, 407, 415, 90, 411, 404; 138/97, 98, 99

[56] References Cited

U.S. PATENT DOCUMENTS

| | | | |
|---|---|---|---|
| 3,233,907 | 2/1966 | Stanton | 285/177 |
| 3,258,822 | 7/1966 | Schlesch et al. | 138/99 |
| 4,049,296 | 9/1977 | Harrison | 285/15 |
| 4,406,481 | 9/1983 | Summerell | 285/15 |
| 4,480,860 | 11/1984 | Foresta et al. | 285/177 |
| 4,568,091 | 2/1986 | Harrison | 285/15 |
| 4,644,975 | 2/1987 | Fricker | 138/99 |

FOREIGN PATENT DOCUMENTS 2426852  1/1980  France ................................. 285/15

Primary Examiner—Randolph A. Reese
Assistant Examiner—Timothy Aberle
Attorney, Agent, or Firm—Matthews & Associates

[57] ABSTRACT

A leak repair clamp for pipe and pipe flanges providing a segmented frame adapted to receive interchangeable annular segmented inserts. All of the inserts provide for interlocking connection with the frame segments but each insert is adapted to fit around one particular diameter cylindrical surface out of a range of different diameter cylindrical surfaces. By selecting particular sized inserts, a single frame can accommodate a wide range of different diameter pipes and pipe fittings. When the insert segments are interlocked into the frame segments, the frame segments are then integrated by bolting threaded studs through flanges to form a unit, which in combination with two interlocked inserts is fastened around and against the cylindrical surface. Thrust restraining set screws are provided to prevent movement of the metal frame relative to the cylindrical surface the frame is fastened around and against. The leak repair clamp further includes injection valves to permit the injection of the liquid sealant into the annular space enclosed by the pipe and pipe clamp and integraded frame and insert unit.

18 Claims, 2 Drawing Sheets

LEAK REPAIR CLAMP

This is a continuation of co-pending application Ser. No. 07/105,819, filed on Oct. 8, 1987, now abandoned.

BACKGROUND OF THE INVENTION

This invention relates to sealing apparatus and, more particularly, relates to a leak repair clamp for repairing pipeline leaks which may be adapted to accommodate a range of different diameter pipes and different diameter pipe fittings.

Leaks often develop at pipe and pipe fitting connections. For example there are problems with thread or weld leaks on screwed or socket-weld connections, at couplings elbows, and unions. Because there are different diameter pipes, and any given pipe diameter may be used in combination with a number of different diameter pipe fittings, the common applications result in so many variations that it is not practical to stock off-the-shelf fixtures for sealing these leaks. The prior art solution to these leaking connections is to custom manufacture a clamp for each leak.

The custom made pipe leak seal clamps are usually manufactured from rectangular bar stock and bored to the fitting diameter on one end and the pipe diameter on the other end. Many of the devices also include an additional strong-back to eliminate any down-pressure movement of the fixture. The obvious problems with this method of repairing leaks are the expense of custom manufacturing a sealing fixture for every leak, and the time delay of the period during manufacture.

The present invention provides a solution to the prior industry problems by providing standard sized pipe clamps which utilize interchangeable inserts to cover the many combinations of closing diameters. The single leak repair clamp of this invention may be used to repair leaks in any one pipe or for repairing leaks occurring in any one of the myriad combinations of pipe and fitting applications.

SUMMARY OF THE INVENTION

The present invention remedies the problems of the prior art by providing a leak repair clamp with interchangeable inserts that provide economical off-the-shelf components for sealing leaks throughout the range of closing diameters of the various pipe and pipe fitting combinations. The clamp is made up of a cylindrical frame comprised of at least two segments. Two grooves are provided, one inside of each open end of the metal frame, to interlockingly connect with a corresponding mounting formed at the outside circumference of each insert of a set of interchangeable segmented metal annular inserts. The inner circumference of each insert is adapted for circumferential sealing connection for one particular diameter cylindrical surface out of a range of different diameter cylindrical surfaces. The inserts are selected for the required closing diameters needed, and then the inserts are slideably interlockingly connected to the metal frame segments. Flanges are used to connect the frame segments together into a cylinder, and the inside circumferences of the inserts are drawn around and against the pipe or pipe fitting. The leak seal clamp further includes a liquid sealant forced through an injection valve into the annular space between the pipe and pipe leak seal clamp. Set screws are provided to prevent any movement of the pipe or pipe flange relative to the leak seal clamp.

BRIEF DESCRIPTION OF THE DRAWINGS

Other objects and advantages of the invention will become apparent upon reading the following detailed description, and upon reference to the drawings in which.

DETAILED DESCRIPTION OF THE INVENTION

Figure 1:
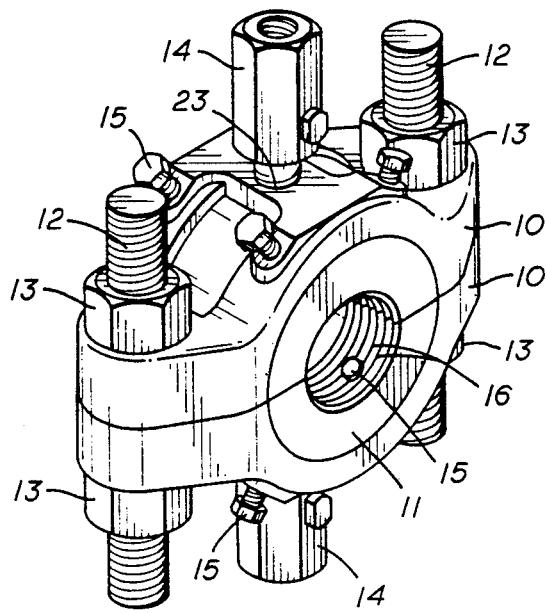
FIG. 1 is a perspective view of a completely assembled leak repair clamp.
Figure 2:
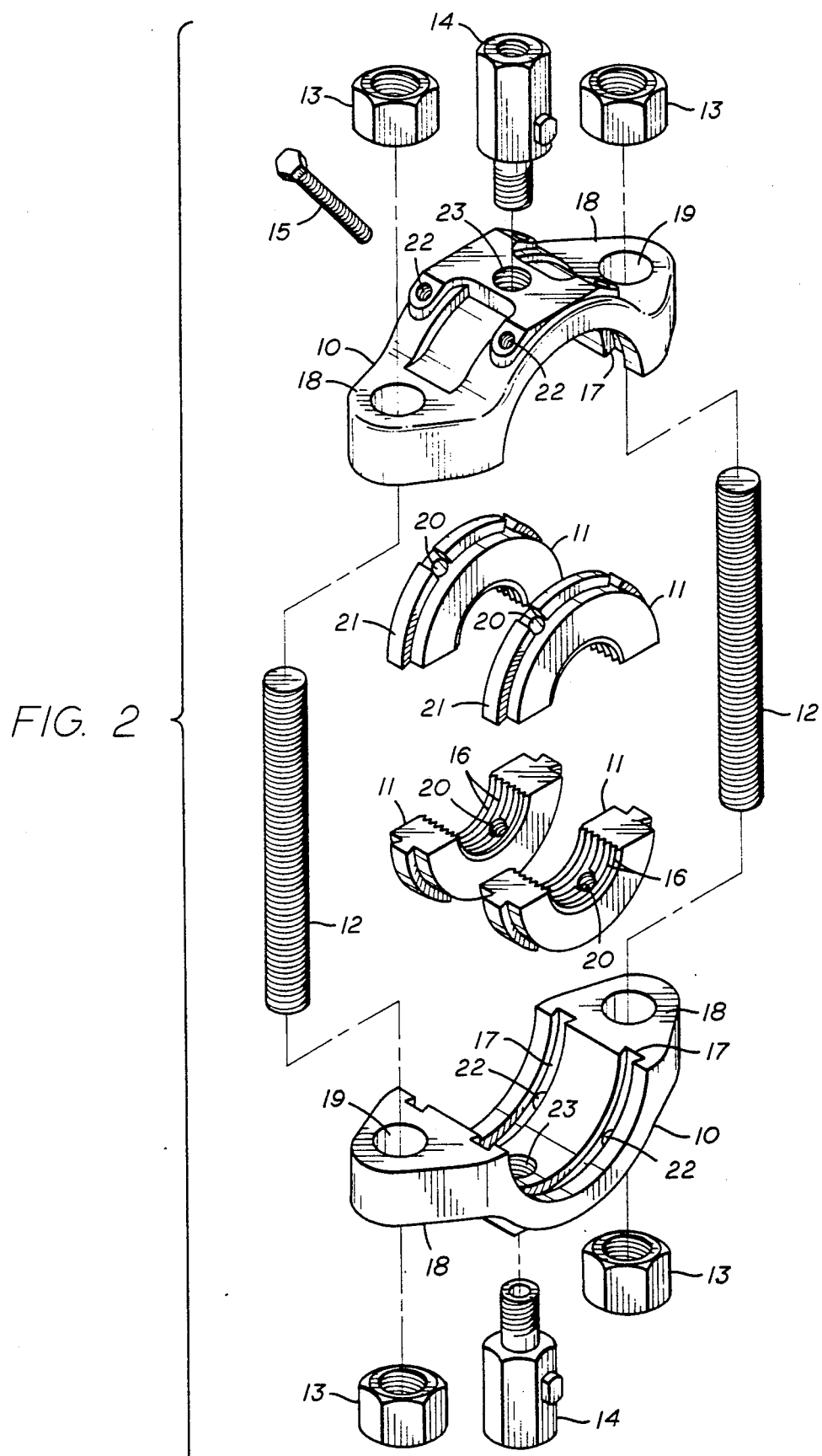
FIG. 2 is an exploded view of a leak repair clamp.

Referring now to the drawings, there is shown in FIG. 1 an assembled combination of one embodiment of the invention and in FIG. 2 an exploded view of components of one embodiment of the invention. Referring particularly to FIGS. 1 and 2, the components illustrated are as follows: the cylindrical metal frame 10, interchangeable annular inserts 11, stud 12 and hex nut 13 fasteners, and the means of injecting and retaining sealant, injection valves 14. Illustrated in FIG. 1, in addition to the above, are the thrust restraining set screws 15. All components may be of cast and machined steel, and therefore economically produced by methods common in the industry.

Figure 4:
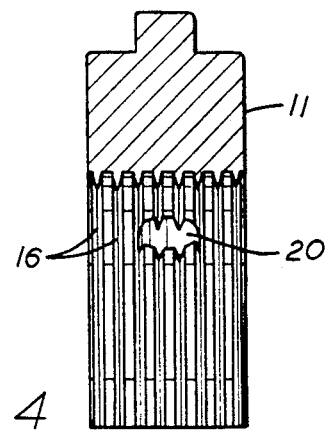
FIG. 4 is a cross-sectional view of an insert segment.
Figure 5:
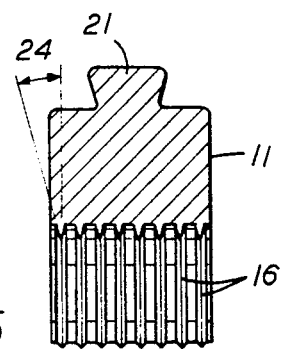
FIG. 5 is a cross-sectional view of an insert segment.
Figure 3:
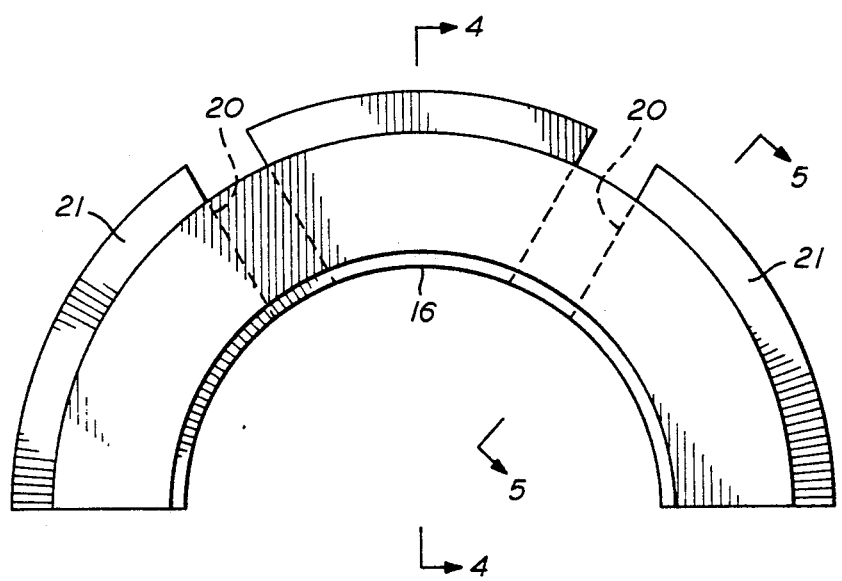
FIG. 3 is a detailed view of an insert segment.

Referring to FIG. 3, there is illustrated one embodiment of a typical segment of one of the interchangeable metal annular inserts 11. FIG. 3 illustrates in detail the interlocking connecting means comprising a dovetail 21 formed at the outer circumference of the insert. In the embodiment illustrated the dovetail 21 is provided only at the two outer thirds of each insert segment and the intermediate third of the circumference is cast or formed into a square cross-section, as may be seen by comparing FIG. 4 to FIG. 5. This configuration is used for tooling ease in manufacture, and does not adversely affect the interlocking connection of the insert to the frame. FIG. 3 also illustrates the sealing connection located at the inner circumference of the insert comprising crunch teeth 16. The dovetail 21 forming the outer circumference, of the insert is formed to slide into one of two corresponding dovetailed grooves 17 cast or machined in the inner circumference of the cylindrical metal frame 10 (FIG. 2). One groove is provided near each end opening of the cylindrical metal frame 10 so that the face of any insert 11 interlockingly assembled into the frame 10 will be flush with the end surface of the frame (FIG. 1). A set of inserts is supplied with each cylindrical metal frame. All of the inserts of the set have identically sized outer circumferences and dovetails, and therefore any insert 11 may be used at either open end of the cylindrical metal frame 10 by aligning the groove 17 and dovetail 21 and sliding segments of the insert 11 into disassembled segments of the cylindrical metal frame 10. As previously mentioned, the inner circumference of each annular metal insert 11 is provided with crunch teeth 16 for labyrinthine metal to metal sealing connection against a cylindrical metal surface. The inserts are formed so that when assembled into a unit with the metal frame, the clearances are essentially nil between points of the crunch teeth, and the cylindrical surface the teeth seal against. The teeth are machined to a sharp angle 24 so that if there is an irregularity in the surface the inserts seal against, the edges of the teeth will roll over and form a lip like seal conforming to the irregularity, but not destroying the labyrinthine seal. The set of annular inserts includes inserts with different inner circumferences so that a range of standard diameter pipe and standard diameter fitting sizes may be accommodated by a single leak repair clamp. Given that there is a wide range of pipe sizes, it may be desirable to provide a series of differently sized cylindrical metal frames. Each frame of the series will then have its own set of interchangeable inserts that will work to seal pipe and fitting combinations within a particular range. Just as it is more practical and economical to provide a single frame with a range of interchangeable inserts than it is to custom manufacture every leak clamp, further economies may be realized by providing a range of differently sized frames, each with its own set of interchangeable inserts. For example, to cover the various diameter requirements of all pipe fittings through two inches, it is desirable to utilize two cylindrical frame sizes, each with its own set of inserts. One frame and insert set would then utilize 15 different sizes of inserts, from 0.840" diameter through 2.437" diameter to cover the included range of standard diameters of pipes and fittings. The second larger frame would utilize eleven different sizes of inserts to seal against standard diameter pipes and fittings ranging from 1.660" diameter to 4.000" diameter. By providing such overlapping ranges of closing diameters, users can select the range that suits their specific needs. The two sizes of frames and corresponding two sets of interchangeable inserts are specifically listed only for example, but by extending the principle and providing larger or smaller frames with corresponding insert sets, any combination of closing diameters is possible.

In the embodiment illustrated, each annular insert is provided at the inner circumference with eight crunch teeth 16 disposed 0.125" apart, measured center to center. Depending upon the specific application, more or less teeth may be used as long as an effective labyrinth type seal is achieved. The teeth 16 may be formed by machining seven grooves at the inner circumference of each insert 11 so that a series of coaxial annular ridges is left at the inner circumference. The inner and outer faces of each insert may also be machined so that the six teeth provided will be identical. FIG. 3. As illustrated, the teeth are formed or machined to an acute angle of $29\frac{1}{2}°$, and are 0.110" tall, but any height or angle performing the previously described sealing function may be used. Because of the close tolerances of manufacture, each segment of any given insert is stamped or otherwise identified as belonging to that particular insert. Therefore every insert is made up of matched segments. Each segment of the insert is drilled for two radial set screw passages 20 (FIG. 3). That is, they are drilled to allow the set screws 15 to freely slip through. Referring particularly to FIG. 3, the locations of these radial set screw passages 20 are shown in detail, with the center lines of the two radial holes 20 dividing each insert segment (FIG. 3) into three equal portions. In other words, as illustrated in FIG. 3, each of the two radial set screw holes 20 is 60° from horizontal, and 60° from the other hole. Each segment of the metal frame 10 is drilled with four radial set screw holes 22 disposed to line up with the radial set screw holes 20 provided in the insert segments that is, 60° from horizontal (FIG. 1) and 60° relative to each other, when said insert segments are interlockingly positioned in the frame. The holes 22 in the frame are threaded to mate with the threads on the set screws 15 which are threaded full length, and which are long enough so that the set screws may be turned into the threaded holes 22 in the frame until they pass through the insert segment radial passages 20 and bear directly against the cylindrical surface the leak clamp is fastened around and against. The set screws 15, when tightened, prevent any down pressure movement of the fixture. When tightened against the pipe or pipe fitting surface the set screws 15 in essence incorporate a strong back into the metal frame 10, and prevent any movement of the metal frame relative to the pipe or pipe fitting surfaces the frame is fastened against.

The inserts 11 and frame 10 are formed in segments to provide for interchanging the inserts. When the frame is disassembled, the sizes of inserts needed are selected and then the insert segments are slidingly interlocked into the dovetailed grooves 17 provided near each open end of the cylindrical metal frame 10. The embodiment illustrated utilizes a two segment frame and two segment inserts. One of the two matched segments of an insert is used in each frame segment, at one open end of the frame. The second insert size is selected for use at the other open end of the cylindrical metal frame, and before the frame is assembled, one of each of the second insert's two matched segments is slideably interlocked into each of the two segments of the metal frame at the second open end. Each segment of the frame, with its connected insert segments, is then fitted around and against the leaking pipe or fitting that it is desired to seal. The threaded studs 12 are then placed through the holes 19 in the flanges 18 of the metal frame 10 and the two segments of the frame are drawn together by the hex nuts 13. The eight threaded set screws 15 are threaded into the holes 22 in the metal frame 10 and are passed through the radial holes 22 drilled through the inserts. The hex nuts 13 are tightened to forcefully draw the pipe clamp combination together around and against the leaking pipe or pipe fitting. The combination of metal frame 10 and two inserts 11 fastened around and against the pipe or pipe fitting forms an annular cavity. As mentioned previously, means is provided in the metal frame 10 for pressure injecting and retaining a sealant. In the embodiment illustrated this means is comprised of inlets 23 and injection valves 14 provided for each segment of the metal frame (FIG. 2). To provide a fluid tight seal, after the pipe clamp insert combination has been fastened around and against the leaking pipe or pipe fitting, the set screws 15 are tightened down to bear against the surface the clamp is fastened against and the injection valves 14 are opened, a liquid sealant is pressure injected through the pressure valves 14 and inlets 23 into the annular cavity, the injection valves 14 are closed, and the sealant is retained within the annular cavity under pressure where it cures, forming a fluid tight seal.

Many modifications besides any specifically mentioned may be made in the techniques and devices mentioned without departing from the scope of the claims. It is to be understood that all herein set forth and portrayed in the accompanying drawings is to be interpreted as illustrative and not in a limiting sense. Numerous other applications will become readily apparent to those of ordinary skill in the art in the light of the teachings of this specification.

What is claimed is:

1. An improved leak repair clamp comprising a metal frame with a cylindrical bore there through, split into sections parallel relative to the axis of the bore so as to comprise at least two components and a set of interchangeable metal insert assemblies wherein:
(a) said metal frame is provided with means for interlocking connection with two metal insert assemblies coaxially disposed relative to each other, and relative to the metal frame, one insert assembly inside of each end of the bore through said frame;
(b) each metal insert assembly comprises a ring formed of at least two separate segments, each segment adapted at the outside circumference for interlocking connection with said metal frame and each segment provided at the inside circumference with means for sealing against the cylindrical surface;
(c) each set of insert assemblies provides multiple insert assemblies each adapted for sealing against cylindrical surfaces of a different diameter;
(d) said frame is provided with fastener means adapted to forcefully fasten segments of the frame and interlocking insert assemblies together to form the integrated leak repair clamp; and,
(e) said frame and interlocked insert assemblies adapted for forceful connection around and against the cylindrical surfaces, so that the frame and any two insert assemblies form an annular cavity between said frame and said surfaces.

2. An improved leak repair clamp comprising a sleeve with an open bore there through; said sleeve split, parallel relative to the axis of the bore, so as to comprise two or more components and a set of interchangeable annular insert assemblies wherein:
(a) each insert assembly comprises two or more segments, and wherein each insert assembly is provided with a circular bore and is adapted to fit around and to circumferencially seal against a cylindrical surface of a particular diameter;
(b) the sleeve is adapted to interlockingly connect with any two insert assemblies, one insert at each opening of the bore through the sleeve so that the circular bores of the two insert assemblies will be coaxial with the axis of the bore at each opening of the bore through the sleeve, thereby forming a sleeve independently adaptable at each bore opening to seal against cylindrical surfaces of various diameters;
(c) the sleeve and insert assembly combination is adapted for forceful connection around and against cylindrical surfaces, forming an annular cavity between said combination and said surfaces; and,
(d) wherein said clamp is provided with thrust restraining means to prevent any movement of the sleeve relative to the cylindrical surfaces sid sleeve is fastened around and against.

3. The leak repair clamp of claim 2, wherein:
(a) radially drilled threaded holes are provided in the wall of said sleeve and corresponding radial drilled holes are provided in the inserts;
(b) the thrust restraining means is provided by threaded set screws which are threaded through the holes drilled in the wall of said sleeve and which will pass through the holes drilled in said inserts and bear against the cylindrical surface the sleeve and insert combination is fastened around and against.

4. An improved leak repair clamp comprising a metal frame with a cylindrical bore there through, split into sections parallel relative to the axis of the bore so as to comprise at least two components and a set of interchangeable metal insert assemblies wherein:
(a) said metal frame is provided with means for interlocking connection with two metal insert assemblies coaxially disposed relative to each other, and relative to the metal frame, one insert assembly inside of each end of the bore through said frame;
(b) each metal insert assembly comprises a ring formed of at least two separate segments, each segment adapted at the outside circumference for interlocking connection with said metal frame and each segment provided at the inside circumference with means for sealing against the cylindrical surface;
(c) each set of insert assemblies provides multiple insert assemblies each adapted for sealing against cylindrical surfaces of a different diameter;
(d) said frame is provided with fastener means adapted to forcefully fasten segments of the frame and interlocking insert assemblies together to form the integrated leak repair clamp;
(e) said frame and interlocked insert assemblies are adapted for forceful connection around and against the cylindrical surfaces, so that the frame and any two insert assemblies form an annular cavity between said frame and said surfaces; and,
(f) wherein said clamp is provided with thrust restraining means to prevent any movement of the cylindrical metal frame relative to the cylindrical surfaces the frame is fastened around and against.

5. The leak repair clamp of claim 4 wherein:
(a) radially drilled threaded holes are provided in the wall of said cylindrical metal frame and corresponding radially drilled holes are provided in said inserts;
(b) the thrust restraining means is provided by threaded set screws which are threaded through the holes drilled in the wall of said frame and which will pass through the holes drilled in said inserts and bear against the cylindrical surface the frame and insert combination is fastened around and against.

6. An improved leak repair clamp comprising a sleeve with an open bore there through; said sleeve split, parallel relative to the axis of the bore, so as to comprise two or more components and a set of interchangeable annular insert assemblies wherein:
(a) each insert assembly comprises two or more segments, and wherein each insert assembly is provided with a circular bore and is adapted to fit around and to circumferencially seal against a cylindrical surface of a particular diameter;
(b) the sleeve is adapted to interlockingly connect with any two insert assemblies, one insert at each opening of the bore through the sleeve so that the circular bores of the two insert assemblies will be coaxial with the axis of the bore at each opening of the bore through the sleeve, thereby forming a sleeve independently adaptable at each bore opening to seal against cylindrical surfaces of various diameters; and,
(c) the sleeve and insert assembly combination is adapted for forceful connection around and against cylindrical surfaces, forming an annular cavity between said combination and said surfaces.

7. An improved leak repair clamp comprising a cylindrical metal frame split into sections parallel relative to the axis of the cylinder so as to comprise at least two segments and a set of interchangeable metal insert assemblies wherein:

(a) said metal frame is provided with means for interlocking connection with two metal insert assemblies coaxially disposed relative to each other, and relative to the metal frame, one insert assembly inside of each end of said cylindrical frame;

(b) each metal insert assembly comprises a ring formed of at least two separate segments, each segment adapted at the outside circumference for interlocking connection with said metal frame and each segment provided at the inside circumference with means for sealing against the cylindrical surface;

(c) each set of insert assemblies provides multiple insert assemblies each adapted for sealing against cylindrical surfaces of a different diameter;

(d) said frame is provided with fastener means adapted to forcefully fasten segments of the frame and interlocking insert assemblies together to form the integrated leak repair clamp;

(e) said frame and interlocked insert assemblies adapted for forceful connection around and against the cylindrical surfaces, so that the frame and any two insert assemblies form an annular cavity between said frame and said surfaces; and, (f) said clamp is provided with thrust restraining means to prevent any movement of the cylindrical metal frame relative to the cylindrical surfaces the frame is fastened around and against.

8. An improved leak repair clamp comprising a sleeve with an open bore there through; said sleeve split, parallel relative to the axis of the bore, so as to comprise two or more components and a set of interchangeable annular insert assemblies wherein;

(a) each insert assembly comprises two or more segments, and wherein each insert assembly is provided with a circular bore and is adapted to fit around and to circumferencially seal against a cylindrical surface of a particular diameter;

(b) the sleeve is adapted to interlockingly connect with any two insert assemblies, one insert at each opening of the bore through the sleeve so that the circular bores of the two insert assemblies will be coaxial with the axis of the bore at each opening of the bore through the sleeve, thereby forming a sleeve independently adaptable at each bore opening to seal against cylindrical surfaces of various diameters; wherein the interlocking connection means between assemblies and sleeve is comprised of two spaced apart grooves defined in the inner wall of said sleeve; said grooves disposed circumferencially one inside each open end of said sleeve and, said grooves dovetailed to retain corresponding dovetails provided at the outside circumference of said annular inserts; and wherein, (c) the sleeve and insert assembly combination is adapted for forceful connection around and against cylindrical surfaces, forming an annular cavity between said combination and said surfaces.

9. The improved leak repair claim of claim 8 wherein the means for sealing against cylindrical surfaces provided at the inner circumference of the assemblies comprises crunch teeth which form a labyrinth seal, between said assemblies and said cylindrical surfaces, when said inserts in combination with said sleeve are forcefully fastened around and against said cylindrical surfaces.

10. The improved leak repair clamp of claim 8 wherein said clamp is adapted to receive a liquid sealant into said annular cavity.

11. The leak repair clamp of claim 10 wherein said sealant is forced into said annular cavity under pressure via an inlet provided through the wall of said sleeve to provide a fluid tight seal between each insert and the cylindrical surfaces.

12. The leak repair clamp of claim 8 including means for injecting and retaining a liquid sealant under fluid pressure within said annular cavity for curing.

13. An improved leak repair clamp comprising a metal frame with a cylindrical bore there through, split into sections parallel relative to the axis of the bore so as to comprise at least two components and a set of interchangeable metal insert assemblies wherein:

(a) said metal frame is provided with means for interlocking connection with two metal insert assemblies coaxially disposed relative to each other, and relative to the metal frame, one insert assembly inside of each end of the bore through said frame;

(b) each metal insert assembly comprises a ring formed for at least two separate segments, each segment adapted at the outside circumference for interlocking connection with said metal frame and each segment provided at the inside circumference with means for sealing against the cylindrical surface;

(c) each set of insert assemblies provides multiple insert assemblies each adapted for sealing against cylindrical surfaces of a different diameter;

(d) said frame is provided with fastener means adapted to forcefully fasten segments of the frame and interlocking insert assemblies together to form the integrated leak repair clamp;

(e) said frame and interlocked insert assemblies adapted for forceful connection around and against the cylindrical surfaces, so that the frame and any two insert assemblies form an annular cavity between said frame and said surfaces; and, (f) wherein the interlocking connection means between inserts and frame is comprises of
two spaced apart grooves defined in the inner wall of said sleeve,
said grooves disposed circumferencially one inside each open end of said sleeve; and,
said grooves dovetailed to retain corresponding dovetails provided at the outside circumference of said annular inserts.

14. The leak repair clamp of claim 13 including means for injecting and retaining a liquid sealant under fluid pressure within said annular cavity for curing.

15. The leak repair clamp of claim 13 wherein said means for forcefully connecting said frame segments together comprises flange means pulled together by threaded fasteners.

16. The improved leak repair clamp of claim 13 wherein said clamp is adapted to receive a liquid sealant into said annular cavity.

17. The leak repair clamp of claim 16 wherein said sealant is forced into said annular cavity under pressure via an inlet provided through the wall of said cylindrical metal frame to provide a fluid tight seal between each insert and the cylindrical surfaces.

18. The improved leak repair clamp of claim 13 wherein the means for sealing against cylindrical surfaces provided at the inner circumference of the annular inserts comprises crunch teeth which form a labyrinth seal, between said inserts and said cylindrical surfaces, when said inserts in combination with said frame are forcefully fastened around and against said cylindrical surfaces.

* * * * *